INVENTORS.
PETER C. GOLDMARK,
BENJAMIN B. BAUER &
BY JOHN M. HOLLYWOOD

Brumbaugh, Free, Graves & Donohue
their ATTORNEYS.

Dec. 12, 1961 P. C. GOLDMARK ET AL 3,013,125

STEREOPHONIC RECORDING

Filed May 16, 1958 2 Sheets-Sheet 2

INVENTORS.
PETER C. GOLDMARK,
BENJAMIN B. BAUER &
BY JOHN M. HOLLYWOOD
Brumbaugh, Free, Graves & Donohue
their ATTORNEYS.

3,013,125
STEREOPHONIC RECORDING

Peter C. Goldmark, New York, N.Y., and Benjamin B. Bauer, Stamford, and John M. Hollywood, Greenwich, Conn., assignors to Columbia Broadcasting System, Inc., New York, N.Y., a corporation of New York Filed May 16, 1958, Ser. No. 735,808
19 Claims. (Cl. 179—100.4)

This invention relates to stereophonic disk recording systems and, more particularly, to a new and improved stereophonic recording system adapted to enhance the quality of reproduction of a stereophonic recording on a non-stereophonic phonograph reproducer.

In systems for recording stereophonic information comprising two binaural signals in a single-groove record disk, it is customary to modulate the disk groove in two perpendicular directions simultaneously. Thus, the groove variations in one direction represent one function of the two binaural signals and those in the other direction represent another function of the two signals. Typically, the groove is cut with lateral modulation representing the sum of the binaural signals and vertical modulation representing the difference between the binaural signals.

When a stereophonic reproducing stylus moves through the groove of a disk prepared in this manner, the stylus responds to the lateral groove modulation in the customary way to generate a signal representing the sum of the binaural signals and, at the same time, is resiliently deflected in the vertical direction in a similar manner by the vertical groove modulation to produce the difference signal. Normally, these two signals are of similar magnitude and it is difficult to design a pickup which will follow them without generating distortion. We have discovered that the difference signal can be limited in amplitude so that it will be as little as one-half that of the sum signal, or less, without impairing substantially the stereophonic character of the recorded information. However, this limiting must be done in the manner hereinafter described. By use of the apparatus and method which we have developed the reproducing stylus is not required to undergo large vertical excursions and distortion is substantially diminished.

Often it is desired to reproduce a stereophonic record on a conventional non-stereophonic phonograph. The reproducing stylus utilized in non-stereophonic phonographs, however, has a relatively high impedance to vertical deflection and, therefore, instead of responding to the vertical track modulation resiliently, the stylus tends to remain in a relatively fixed vertical position. Therefore, when a non-stereophonic stylus moves through a disk groove modulated in the vertical direction, the effective stylus load on the disk is varied by the vertical groove modulation and when the vertical modulation reaches extremes which cause improper tracking of the stylus in the lateral direction, the reproducer generates distorted signals.

Accordingly, it is an object of this invention to provide a new and improved recording system capable of producing improved single-groove stereophonic disks.

A further object of the invention is to provide a new and improved recording system capable of producing single-groove stereophonic phonograph disks which may be played on a non-stereophonic phonograph without causing improper tracking.

Another object of the invention is to provide a system of the above character for producing a stereophonic record wherein the vertical modulation of the record groove does not interfere with the response of a non-stereophonic reproducer and, at the same time, retains excellent stereophonic properties.

These and other objects of the invention are accomplished by deriving two audio information signals, one defining the lateral modulation of the record groove and the other defining the vertical groove modulation, and transmitting them through separate channels. In the vertical information channel, the information signal is limited according to the motion characteristics of non-sterephonic reproducers to prevent improper tracking thereof, and the modified signal is applied to a stereophonic stylus to modulate the groove in the vertical direction.

In one embodiment of the invention, the information signal in the vertical channel is divided into several frequency bands, each transmitting a selected portion of the frequency spectrum and the amplitude of the information signal passing througt each band is limited according to the motion characteristics of non-stereophonic reproducers. Another embodiment of the invention analyzes the vertical information signal into component signals representing the physical motion of a reproducing stylus which would be induced thereby, such as its amplitude, velocity and acceleration. Each of these component signals is limited in a predetermined manner according to the motion characteristics of non-stereophonic reproducers and all the signals are recombined into a modified vertical information signal.

A further embodiment of the invention divides both the lateral and vertical information signals into corresponding component signals. In the vertical channel each component signal is limited according to its effect on non-stereophonic reproducers, while the corresponding lateral information signal is expanded proportionally so that the total power content of the recorded signals is the same as that of the input signals.

Further objects and advantages of the invention will be apparent from a reading of the following description in conjunction with the accompanying drawings in which.

Figure 1:
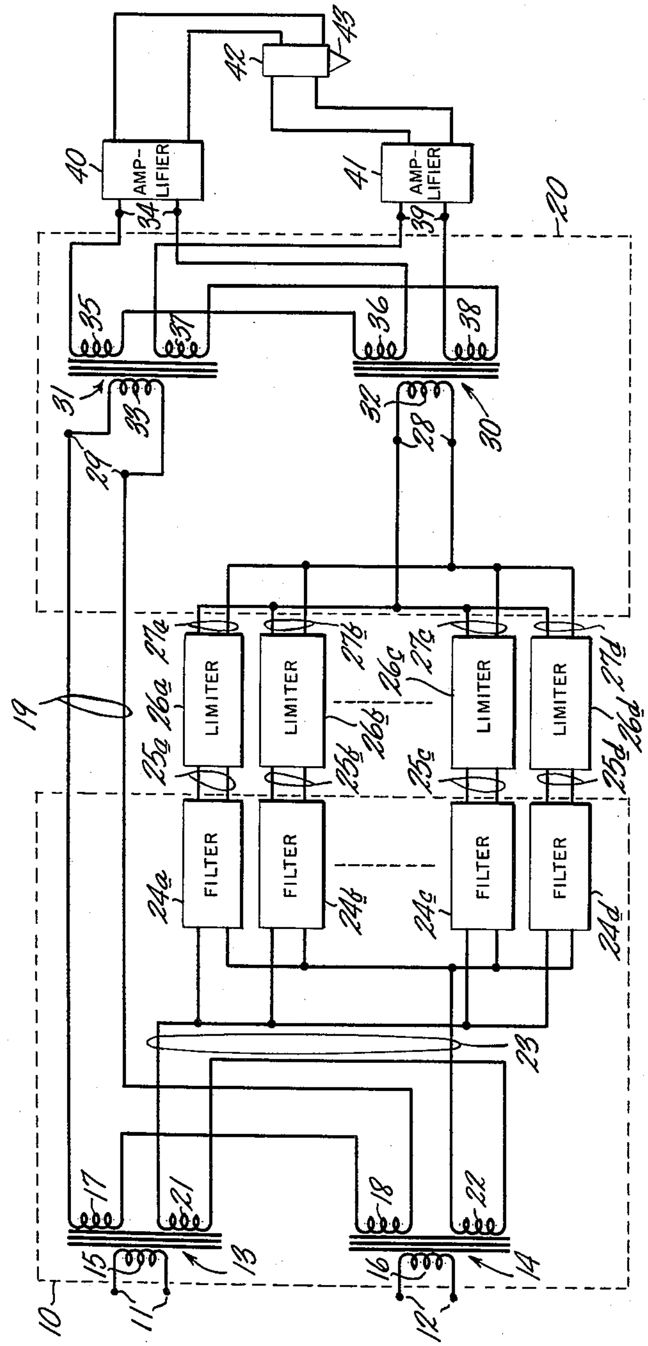
FIG. 1 is a schematic circuit diagram illustrating one embodiment of a stereophonic recording system arranged according to the invention.

In the embodiment of the invention illustrated in FIG. 1, an input circuit 10 receives binaural signals detected at two spaced locations through two pairs of terminals 11 and 12, respectively. Within the input circuit, the signal information is applied to two identical matrixing transformers 13 and 14 through primary windings 15 and 16 from the pairs of terminals 11 and 12, respectively. In order to generate an audio information signal representing the sum of the two binaural signals, one secondary winding 17 of the transformer 13 is connected in series and in phase with a like output winding 18 of the transformer 14, this signal being carried through a channel 19 to an output circuit 20. As described hereinafter, the sum signal in this channel is utilized to modulate the record groove in the lateral direction, while another information signal representing the difference between the binaural signals controls the vertical groove modulation.

Another secondary winding 21 of the transformer 13 is linked in series and in out-of-phase relation with a similar secondary winding 22 of the transformer 14, generating a signal representing the difference between the two binaural signals. This signal is applied through a second channel 23 to a group of parallel-connected band pass filters, only four of which, 24*a*–24*d*, are illustrated in the drawings. It will be understood that audio information signals representing any other functions of the binaural signals may be utilized with the stereophonic recording system of the invention to control the horizontal and vertical variations of the record groove.

In the channel 23, the filters 24*a*–24*d*, which may be of any conventional type, divide the vertical information signal into any suitable number of frequency bands and the signal in each band is transmitted through the corresponding one of a group of sub-channels 25*a*–25*d*. As a typical example, the vertical information signal may be divided into a series of octaves so that the filter 24*a* passes a 50 to 100 cycle band, the filter 24*b* transmits 100 to 200 cycles, the filter 24*c* passes a 3200 to 6400 cycle band, and the filter 24*d* has a 6400 to 12,800 cycle band width, the intermediate octaves being transmitted by the remaining filters of the group (not shown).

In order to prevent the vertical information signal in any frequency band from reaching an extreme level which would cause improper lateral tracking of a non-stereophonic reproducer and permit the signals in other frequency bands to be transmitted without modification, each of the sub-channels 25*a*–25*d* includes a corresponding limiting circuit 26*a*–26*d*. Each of these limiters is of the usual type which decreases the amplification of a signal whenever the signal amplitude rises above a predetermined level. Inasmuch as each of the limiters operates independently of the others, it will be noted that the limiters may be set to produce their limiting action at different levels according to the motion characteristics of non-stereophonic reproducers within the corresponding frequency range. Thus, if audio information signals in the band passed by the filter 24*a* caused improper tracking when they reach a particular amplitude and signals passed by the filter 24*c* do not result in poor tracking until twice that amplitude is attained, the limiter 26*c* can be set to begin its limiting action at a level substantially higher than that of the limiter 26*a*. Also, since each of the frequency bands is limited independently of the others, all but one of the frequency band signals remain unaffected when the signal at a particular frequency reaches its limiting level and is subjected to limiting action, thereby transmitting undistorted signals over substantially the entire frequency spectrum. Obviously, in many cases it will not be necessary to limit the signals in all of the frequency bands since signals at certain frequencies may be incapable of generating excessive vertical excursions. Accordingly, one or more of the limiters 26*a*–26*d* may be omitted from the embodiment shown in FIG. 1.

Audio information component signals passed by the limiters 26*a*–26*d* are carried through a group of corresponding output channels 27*a*–27*d* which are connected in parallel to a pair of terminals 28 within the output circuit 20. Thus, the limited frequency band signals are combined into a modified vertical information signal at the terminals 28, another pair of terminals 29 receiving the lateral information signal from the channel 19. If the record disk is to be cut with a 45° stereophonic cutter arranged to receive binaural information signals from each of the two spaced locations rather than lateral and vertical signals, the output circuit 20 includes two matrixing transformers 30 and 31 having primary windings 32 and 33 connected to the pairs of terminals 28 and 29, respectively. In order to generate binaural signals corresponding to those from the two spaced locations, one pair of output terminals 34 is linked to one secondary winding 35 and 36 of each transformer. These windings are connected in series and in phase while two other secondary windings 37 and 38, connected in series and in out-of-phase relation, lead to another pair of output terminals 39.

Suitable audio amplifiers 40 and 41 amplify the signals from the pairs of terminals 34 and 39, respectively, and transmit them to a recording transducer 42 which drives a cutting stylus 43, the transducer in this case being arranged to modulate the record groove laterally in accordance with the sum of the signals at the terminals 29 and 28 and vertically in accordance with difference between these signals. If the transducer 42 is of the type adapted to modulate the groove vertically in response to the signal at the pair of terminals 28 and laterally according to the signal at the terminals 29, the matrixing transformers 30 and 31 in the output circuit 20 can be omitted and the pairs of terminals 28 and 29 connected directly to the pairs of terminals 39 and 34, respectively.

In operation, the transformers 13 and 14 receive binaural audio signals from the pairs of terminals 11 and 12 and generate sum and difference signals which are applied to the channels 19 and 23 and represent lateral and vertical groove modulation, respectively. In the vertical information channel 23, the difference signal is divided into a series of frequency bands by the filters 24*a*–24*d* and transmitted through the corresponding sub-channels 25*a*–25*d*. Whenever the amplitude of the signal in any of these channels rises above a level which would cause improper tracking in a non-stereophonic reproducer, it is limited by the corresponding one of the limiters 26*a*–26*d*. After being modified in this manner, the signals in all the frequency bands are combined and transmitted to the pair of terminals 28 in the output circuit 20 to control the vertical modulation of the record groove in the manner described above, the lateral modulation being governed by the signal from the channel 19.

Figure 2:
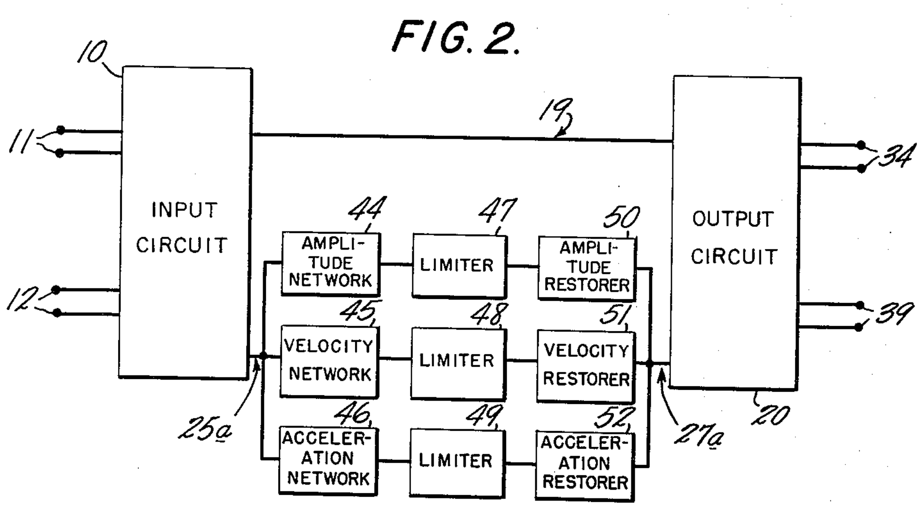
FIG. 2 is a block diagram illustrating another embodiment of the stereophonic recording system.

As shown in FIG. 2, another embodiment of the stereophonic recording system of the invention includes, in each frequency band of the vertical information channel 23, a group of networks for analyzing that portion of the vertical information signal into components representing the vertical motion of a reproducing stylus which would be induced if the signal were recorded without modification. In the illustrated example, an amplitude network 44, a velocity network 45, and an acceleration network 46 analyze the vertical information signal in the sub-channel 25*a* to generate signals proportional to the vertical amplitude, velocity, and acceleration of a reproducing stylus which would be produced by a recorded signal. It will be understood that networks for deriving only one or two of these motion components may be utilized in the invention and that analyzing networks generating any other suitable signals representing reproducer stylus motion may be substituted in any or all of the sub-channels.

Connected to receive the output signal from each of these analyzing networks respectively, three conventional limiting circuits 47, 48 and 49 are adapted to limit the motion signals at predetermined levels according to the corresponding characteristics of non-stereophonic reproducers so that no signal which could direct a reproducer motion causing improper tracking and distorted sound is transmitted. In this manner, vertical signal components which might produce improper lateral tracking of a non-stereophonic reproducer at relatively low levels, such as the acceleration component, for example, are appropriately restricted without affecting the components which have less influence on tracking, such as the amplitude signal, for example. From the limiters 47, 48 and 49 the modified signal components are carried through suitable restoring networks, referred to as an amplitude restorer 50, a velocity restorer 51, and an acceleration restorer 52, respectively. These elements restore the analyzed motion components into a modified vertical information signal in each frequency band, all the frequency band signals being combined at the pair of terminals 28 in the output circuit.

Although the analyzing, limiting, and restoring elements for only one of the frequency sub-channels 25*a* are illustrated in FIG. 2, it will be understood that each of the other sub-channels 25*b*–25*d* of FIG. 1 may include similar elements in this embodiment of the invention. In each channel, however, the various limiters are adjusted according to the effect of the signal components in that channel on non-stereophonic reproducers. Furthermore, inasmuch as those motion components of the vertical information signal which are directly related to the tracking properties of non-stereophonic reproducers are selected and appropriately limited by the embodiment shown in FIG. 2 without distorting other signal components which have little or no relation to tracking, it will be readily apparent that the tonal fidelity of the signal transmitted in each frequency band is substantially improved by including the analyzing elements of this embodiment. Accordingly, the number of frequency bands into which the audio spectrum of the vertical information signal is divided can be substantially reduced. For example, excellent results are obtained by dividing the vertical information signal into three bands of, for example, 50 to 1000, 1000 to 4000, and 4000 to 15,000 cycles and including an analyzing system similar to that of FIG. 2 in each band. In fact, substantially improved tracking of non-stereophonic reproducers can be produced by utilizing the analyzing and limiting system of FIG. 2 in the vertical information channel without separating the channel into frequency sub-channels. In this case, the filters *24a–24d* in the input circuit 10, shown in FIG. 1, are omitted and the channel 23 is connected directly to the channel *25a*.

Figure 3:
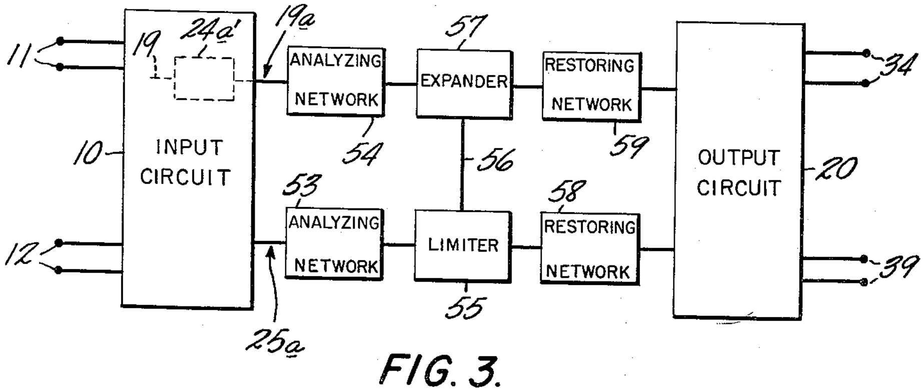
FIG. 3 is a block diagram showing another embodiment of the invention.

In order to conserve the total binaural signal power generated at the two spaced locations and still limit the vertical information signal to prevent improper tracking of non-stereophonic reproducers, another embodiment of the invention includes within the input circuit 10 band pass filters in the lateral information channel 19 identical to those in the vertical information channel 23, one of these filters *24a'* being illustrated in phantom in FIG. 3. Accordingly, when the lateral information signal is transmitted through the channel 19, it is divided into frequency band signals corresponding to those of the vertical information signal. In each of the lateral and vertical sub-channels, such as the channels *19a* and *25a* of FIG. 3, analyzing networks similar to the networks 44, 45 and 46 of FIG. 2 generate corresponding motion component signals representing the lateral and vertical motion functions which would be induced in a reproducing stylus by the recorded information signals. Thus, in the vertical frequency sub-channel *25a*, an analyzing network 53 generates a signal which represents a function of the vertical motion, for example, acceleration, while in the corresponding lateral sub-channel *19a*, an analyzing network 54 produces a signal representing the same function of the lateral motion.

In the vertical sub-channel *25a* one or more of the motion component signals is appropriately limited to prevent it from causing improper tracking of a non-stereophonic reproducer by a limiter 55, which operates in the manner described above with respect to the embodiment of FIG. 2. At the same time, however, the limiter 55 transmits a signal indicating the extent to the vertical signal limiting action through a line 56 to a signal expander 57. The expander 57, which may be of any conventional type adapted to expand an input signal in response to a control signal, receives the corresponding lateral signal component from the analyzing network 54 and expands it in proportion to the limiting of the vertical signal, thereby preserving the total audio signal power. Suitable restoring networks 58 and 59 which receive the modified signals from the limiter 55 and the expander 57 reconvert them into difference and sum signals, respectively, and transmit them to the output circuit 20.

If desired, the analyzing and restoring networks 53, 54, 58 and 59 may be omitted from the embodiment shown in FIG. 3 so that the entire vertical information signal in one or more of the frequency bands is limited in the manner described with respect to the embodiment shown in FIG. 1, while the lateral information signal in the corresponding frequency band of the channel 19 is expanded proportionally. Similarly, the band pass filters may be eliminated from each of the channels 19 and 23 in the input circuit 10 so that the vertical and the lateral information signals for the entire audio spectrum are analyzed into corresponding reproducer motion signal components, each lateral component signal being expanded in proportion to the limiting of the corresponding vertical component signal.

Although the invention has been described herein with reference to specific embodiments, many modifications and variations therein will readily occur to those skilled in the art. Accordingly, all such variations and modifications are included within the intended scope of the invention as defined by the following claims.

We claim:

1. Apparatus for recording two stereophonic signals in the same groove of a record disk comprising means for generating a lateral information signal representing one function of the two stereophonic signals, means for generating a vertical information signal representing a second function of the stereophonic signals, limiting circuit means for limiting selected frequency components in the vertical information signal to prevent that signal from producing extremes of vertical groove modulation, and transducer means for modulating the groove in the lateral direction in response to the lateral information signal and modulating the groove in the vertical direction in response to the limited vertical information signal.

2. Apparatus for recording two audio information signals in the same groove of a record disk by modulating the groove in the lateral direction in response to one signal and in the vertical direction in response to the other signal comprising analyzer means for dividing the vertical information signal into a plurality of component signal bands of different frequencies, limiting at least one of the component signal bands to prevent that signal from generating extremes of vertical groove modulation, and common output means for combining the limited component signals.

3. Apparatus for recording two audio information signals in the same groove of a record disk by modulating the groove in the lateral direction in response to one signal and in the vertical direction in response to the other signal comprising analyzer means for dividing the vertical information signal into a plurality of frequency bands, limiting circuit means for limiting the signal in at least one of the frequency bands in a predetermined manner, and common output means for combining the signals from all the frequency bands.

4. Apparatus for recording two stereophonic signals in the same groove of a record disk comprising transformer means for generating first and second audio information signals representing different functions of the two stereophonic signals, limiting circuit means arranged to limit at least one band of frequency components in the first audio information signal in a predetermined manner to prevent that signal from producing extremes of record groove modulation, and transducer means for modulating a record groove in the vertical direction in response to the modified first audio-information signal and in the lateral direction in response to the second audio information signal.

5. Apparatus for recording two stereophonic signals in the same groove of a record disk wherein the ability of non-stereophonic reproducers to reproduce information recorded in the groove is enhanced comprising means for generating lateral and vertical audio information signals representing different functions of the two stereophonic signals, means for dividing the vertical audio information signal into a plurality of component signal bands of different frequencies, means for limiting at least one of the component signal bands in a predetermined manner to prevent it from causing improper tracking of non-stereophonic reproducers, and transducer means for modulating a record groove in the vertical direction in response to all the component signals of the vertical audio information signal and in the lateral direction in response to the lateral audio information signal.

6. Apparatus for recording lateral and vertical audio information signals in the same groove of a record disk wherein the ability of non-stereophonic reproducers to reproduce information recorded in the groove is enhanced comprising filter means for dividing the vertical audio signal into a plurality of frequency bands, means for limiting the vertical audio signal in at least one frequency band in a predetermined manner to prevent it from causing improper tracking of non-stereophonic reproducers, and transducer means for modulating a record groove in the vertical direction in response to the signals in all the frequency bands of the vertical audio information signal and in the lateral direction in response to the lateral audio information signal.

7. Apparatus for recording lateral and vertical audio information signals in the same groove of a record disk comprising analyzer means fo separating the vertical audio signal into a plurality of component signals each representing a function of the motion of a reproducer which would be induced thereby, means for limiting at least one of the component signals in a predetermined manner, means for restoring the limited component signals into a modified vertical information signal, and transducer means responsive to the modified vertical information signal for modulating a record groove in the vertical direction and to the lateral information signal for modulating the groove in the lateral direction.

8. Apparatus for recording lateral and vertical audio information signals in the same groove of a record disk comprising filter means for dividing the vertical audio signal into a plurality of frequency bands, analyzer means for separating the signal in at least one of the frequency bands into a plurality of component signals each representing a function of the motion of a reproducer which would be induced thereby, means for limiting at least one of the component signals in a predetermined manner to prevent it from causing improper tracking of non-stereophonic reproducers, means for restoring the component signals into a modified vertical information signal, and transducer means responsive to the modified vertical information signal for modulating a record groove in the vertical direction and to the lateral information signal for modulating the groove in the lateral direction.

9. Apparatus for recording lateral and vertical audio information signals in the same groove of a record disk comprising means for dividing the vertical audio information signal into a plurality of component signals, means for limiting at least one of the component signals in a predetermined manner to prevent it from causing improper tracking of a reproducer, means for dividing the lateral information signal into a corresponding plurality of component signals, expander means for expanding each of the lateral component signals in proportion to the limiting of the corresponding vertical information component signal, and transducer means for modulating a record groove in the vertical direction in response to all the vertical component signals and in the lateral direction in response to all the lateral information component signals.

10. Apparatus for recording lateral and vertical audio information signals in the same groove of a record disk wherein the ability of non-stereophonic reproducers to reproduce information recorded in the groove is enhanced comprising filter means for dividing the vertical audio signal into a plurality of frequency bands, analyzer means for separating the signal in each frequency band into a plurality of component signals each representing a function of the motion of a reproducer which would be induced thereby, means for limiting each of the component signals in a predetermined manner to prevent it from causing improper tracking of non-sterephonic reproducers, filter means for dividing the lateral information signal into a plurality of frequency bands corresponding to those of the vertical information signal, analyzer means for separating the signal in each of the lateral information frequency bands into a plurality of component signals each representing a function of the lateral motion of a reproducer which would be induced thereby and corresponding to the component signals of the corresponding vertical frequency band, expander means for expanding each of the lateral component signals in proportion to the limiting of the corresponding vertical component signal, means for restoring the lateral component signals into a modified lateral information signal, means for restoring the vertical component signals into a modified vertical information signal, and transducer means for modulating a record groove in the lateral direction in response to the modified lateral information signal and in the vertical direction in response to the modified vertical information signal.

11. Apparatus for representing two stereophonically related signals comprising limiting circuit means for limiting selected frequency components in one of said signals to a predetermined amplitude, and producing a wave form modulated in separably different modes in accordance with a function of said one signal after limiting and with a function of the other of said two signals, respectively.

12. Apparatus for representing two stereophonically related signals comprising, analyzer means for separating one of said signals into bands of different frequency components, limiting circuit means for limiting the frequency components in said respective bands to predetermined amplitudes, and combining means for producing a wave form modulated in separably different modes in accordance with a function of said one signal after limiting and with a function of the other of said two signals, respectively.

13. Apparatus for representing two stereophonically related signals comprising, limiting circuit means for limiting the amplitudes of selected frequency components in one of said signals, expanding the amplitudes of corresponding frequency components in the other of said signals, and combining means for producing a wave form modulated in separably different modes in accordance with a function of said one signal after limiting and with a function of said other signal after expanding, respectively.

14. In stereophonic apparatus, the combination of input means adapted to receive first and second stereophonically related signals and to provide a first output representing a first combination of said first and second signals and a second output representing a different combination of said first and second signals, a first channel connected to receive said first output, a second channel connected to receive said second output, signal amplitude limiting means in said second channel, and combining means for producing a wave form modulated in separably different modes in accordance with a function of said first output and with a function of said second output after limiting, respectively.

15. In stereophonic apparatus, the combination of a first channel adapted to receive one of two sterephonically related signals and to provide an output, a second channel adapted to receive the second of said two stereophonically related signals, signal amplitude limiting means in said second channel, output means connected to receive the outputs of said first and second channels and to provide a first output signal representing a first combination of said channel outputs and a second output signal representing a different combination of said channel outputs, and combining means for producing a wave form modulated in separably different modes in accordance with a function of said first output signal and with a function of said second output signal, respectively.

16. In stereophonic apparatus, the combination of input means adapted to receive first and second stereophonically related signals and to provide a first output representing a first combination of said first and second signals and a second output representing a different combination of said first and second signals, a first channel connected to receive said first output, a second channel connected to receive said second output, signal amplitude limiting means in said second channel, output means connected to receive the outputs of said first and second channels and to provide a first output signal representing a first combination of said channel outputs and a second signal representing a different combination of said channel outputs, and combining means for producing a wave form modulated in separably different modes in accordance with a function of said first output signal and with a function of said second output signal, respectively.

17. In stereophonic apparatus, the combination of input means adapted to receive first and second stereophonically related signals and to provide a first output representing a first combination of said first and second signals and a second output representing a different combination of said first and second signals, a first channel connected to receive said first output, a second channel connected to receive said second output, means in said second channel for limiting the amplitudes of certain frequency components in said second output, and combining means responsive to the outputs of said first and second channels for producing a wave form modulated in separably different modes in accordance with functions of said outputs, respectively.

18. In stereophonic apparatus, the combination of input means adapted to receive first and second stereophonically related signals for providing first and second outputs representing, respectively, the sum and difference of said first and second signals, a first channel connected to receive said first output representing said sum, a second channel connected to receive said second output representing said difference, means in said second channel for separating said difference representing output into a plurality of frequency bands, means for limiting the signal amplitude in at least one of said frequency bands in a predetermined manner, and combining means for producing a wave form modulated in separably different modes in accordance with functions of the outputs of said first and second channels, respectively.

19. In stereophonic apparatus, the combination of first and second channels adapted to receive, respectively, two stereophonically related signals, signal amplitude limiter means in one of said channels for signal components in a predetermined frequency band, signal amplitude expander means in the other of said channels for signal components in said frequency band, said expander means being responsive to the operation of said limiter means, and means for producing a wave form modulated in separably different modes in accordance with functions of the outputs of said first and second channels, respectively.

References Cited in the file of this patent

UNITED STATES PATENTS

| | | |
|---|---|---|
| 2,093,540 | Blumlein | Sept. 21, 1937 |
| 2,105,916 | Harrison | Jan. 18, 1938 |
| 2,114,471 | Keller et al. | Apr. 19, 1938 |
| 2,698,379 | Boelens | Dec. 28, 1954 |
| 2,763,726 | Weller | Sept. 18, 1956 |
| 2,851,532 | Crosby | Sept. 9, 1958 |
| 2,874,221 | Dauguet | Feb. 17, 1959 |
| 2,922,848 | Miller | Jan. 26, 1960 |

UNITED STATES PATENT OFFICE

CERTIFICATE OF CORRECTION

Patent No. 3,013,125 December 12, 1961

Peter G. Goldmark et al.

It is hereby certified that error appears in the above numbered patent requiring correction and that the said Letters Patent should read as corrected below.

Column 6, line 33, before "limiting" insert -- limiting circuit means for --; column 8, line 21, before "producing" insert -- combining means for --; line 39, before "expanding" insert -- expander means for --.

Signed and sealed this 17th day of April 1962.

(SEAL)
Attest:

ESTON G. JOHNSON

Attesting Officer

DAVID L. LADD

Commissioner of Patents